US009683605B2

(12) United States Patent
Murata et al.

(10) Patent No.: US 9,683,605 B2
(45) Date of Patent: Jun. 20, 2017

(54) TAPERED ROLLER BEARING

(71) Applicant: JTEKT CORPORATION, Osaka-shi, Osaka (JP)

(72) Inventors: Junji Murata, Kashiba (JP); Shigeo Kamamoto, Kashiwara (JP); Yuki Shishihara, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/973,103

(22) Filed: Dec. 17, 2015

(65) Prior Publication Data
US 2016/0186810 A1    Jun. 30, 2016

(30) Foreign Application Priority Data
Dec. 26, 2014  (JP) .................. 2014-264869

(51) Int. Cl.
*F16C 33/58*  (2006.01)
*F16C 33/66*  (2006.01)
*F16C 19/36*  (2006.01)
*F16C 33/36*  (2006.01)
*F16C 21/00*  (2006.01)

(52) U.S. Cl.
CPC .......... *F16C 33/585* (2013.01); *F16C 33/366* (2013.01); *F16C 33/6614* (2013.01); *F16C 33/6651* (2013.01); *F16C 19/364* (2013.01); *F16C 21/00* (2013.01); *F16C 2240/54* (2013.01)

(58) Field of Classification Search
CPC ........ F16C 19/34; F16C 19/36; F16C 19/364; F16C 19/383–19/388; F16C 33/58; F16C 33/583; F16C 33/585; F16C 33/366; F16C 2240/50
See application file for complete search history.

(56) References Cited

U.S. PATENT DOCUMENTS

| | | | | |
|---|---|---|---|---|
| 3,525,558 A * | 8/1970 | Johnston | ............... | F16C 19/225 384/465 |
| 6,033,123 A * | 3/2000 | Sato | ...................... | F16C 19/225 384/571 |
| 6,379,049 B1 * | 4/2002 | Shibazaki | ............. | F16C 19/225 384/450 |
| 6,464,398 B2 * | 10/2002 | Takehara | ............. | F16C 19/225 384/450 |

(Continued)

FOREIGN PATENT DOCUMENTS

| | | |
|---|---|---|
| JP | H05-75520 U | 10/1993 |
| JP | 2010-265926 A | 11/2010 |
| JP | 2013-174256 A | 9/2013 |

*Primary Examiner* — Alan B Waits
(74) *Attorney, Agent, or Firm* — Oliff PLC

(57) ABSTRACT

An inner ring has a rib face as a concave surface that is formed on the larger diameter side of an inner ring and that contacts large end faces of tapered rollers. A tapered roller bearing satisfies Ri>R≥Rr, where Rr represents a curvature radius of the large end face, Ri represents a curvature radius of the rib face 8 in a longitudinal section of the inner ring 2, R represents a distance from a cone center to a reference point. The distance R is the distance from the cone center to the reference point, where the reference point is the intersection of the rib face and an imaginary line extending from the cone center and along an inner ring raceway surface in the longitudinal section of the inner ring 2. Surface roughness of the rib face is greater than that of the large end face.

4 Claims, 13 Drawing Sheets

(56) References Cited

U.S. PATENT DOCUMENTS

| | | | | |
|---|---|---|---|---|
| 6,502,996 B2* | 1/2003 | Joki | ................... | F16C 19/364 |
| | | | | 384/450 |
| 6,530,693 B1* | 3/2003 | Ijuin | ................... | F16C 19/225 |
| | | | | 384/450 |
| 6,623,168 B2* | 9/2003 | Matsuyama | .......... | F16C 19/225 |
| | | | | 384/450 |
| 6,702,471 B2* | 3/2004 | Sakoda | ................ | F16C 19/225 |
| | | | | 384/450 |
| 7,874,737 B2* | 1/2011 | Matsuyama | ............ | F16C 33/36 |
| | | | | 384/450 |
| 8,152,383 B2* | 4/2012 | Ueno | ................... | F16C 19/364 |
| | | | | 384/571 |
| 9,243,667 B2* | 1/2016 | Kamamoto | ........... | F16C 37/007 |
| 2007/0041678 A1* | 2/2007 | Matsuyama | .......... | F16C 19/225 |
| | | | | 384/571 |
| 2015/0198202 A1* | 7/2015 | Murata | ................ | F16C 33/585 |
| | | | | 384/571 |

\* cited by examiner

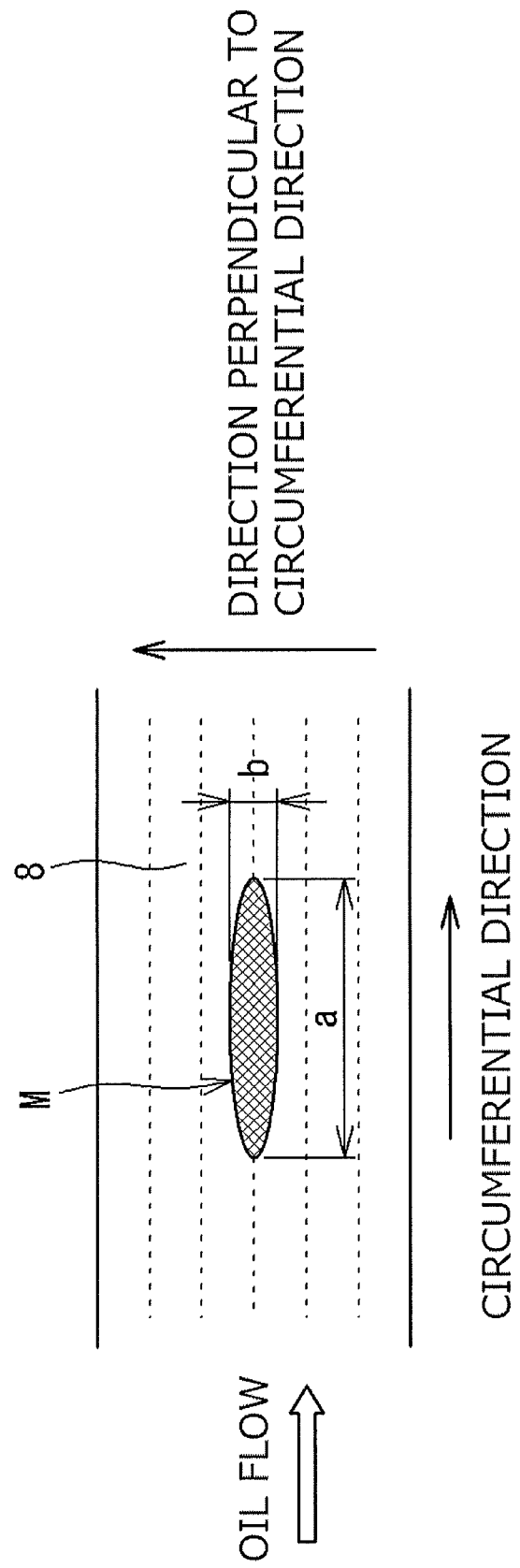

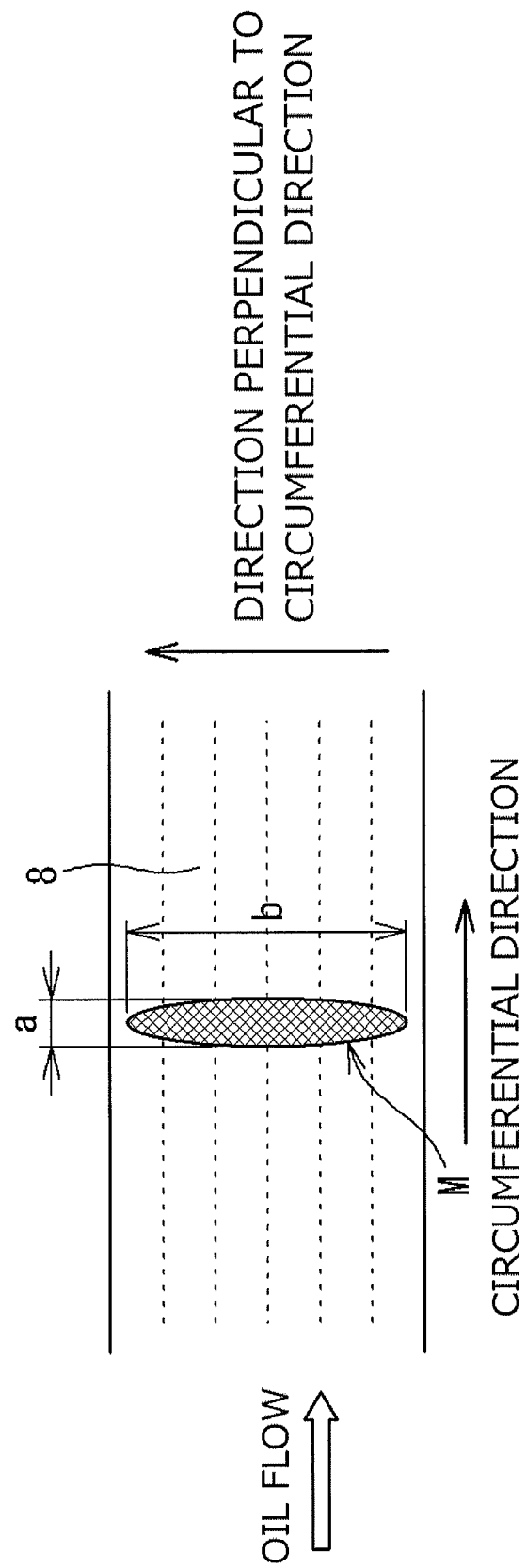

SURFACE ROUGHNESS OF RIB FACE

SURFACE ROUGHNESS OF LARGE END FACE

TAPERED ROLLER BEARING

INCORPORATION BY REFERENCE

The disclosure of Japanese Patent Application No. 2014-264869 filed on Dec. 26, 2014 including the specification, drawings and abstract, is incorporated herein by reference in its entirety.

BACKGROUND OF THE INVENTION

1. Field of the Invention

The present invention relates to tapered roller bearings.

2. Description of the Related Art

As shown in FIG. 16, a tapered roller bearing 90 includes an inner ring 91, an outer ring 93, a plurality of tapered rollers 95, and an annular cage 96. The inner ring 91 has a tapered inner ring raceway surface 92. The outer ring 93 has a tapered outer ring raceway surface 94. The tapered rollers 95 roll on the inner ring raceway surface 92 and the outer ring raceway surface 94. The cage 96 retains the tapered rollers 95 at intervals in the circumferential direction. The inner ring 91 has a cone back face rib (hereinafter referred to as a large rib) 97 formed on the larger diameter side of the inner ring 91 so as to protrude outward in the radial direction. The large rib 97 has an annular rib face 99 that contacts large end faces 98 of the tapered rollers 95.

When the tapered roller bearing 90 is rotated, the tapered rollers 95 roll on the raceway surfaces 92, 94, and the large end faces 98 of the tapered rollers 95 slidingly contact the rib face 99 of the inner ring 91. A tapered roller bearing is developed in which the large end faces 98 are convex surfaces having a predetermined curvature radius and the rib face 99 is a concave surface having a predetermined curvature radius in order to reduce friction resistance (sliding friction resistance) between the large end faces 98 and the rib face 99 (see, e.g., Japanese Utility Model Application Publication No. H05-75520).

A common method to reduce the friction resistance between the large end faces 98 of the tapered rollers 95 and the rib face 99 of the inner ring 91 is to reduce particularly the surface roughness of the rib face 99. Conventionally, the rib face 99 is therefore super-finished, lapped, etc. after being ground.

However, since the rib face 99 is a concave surface as described above and is an annular face located inside a recess of the inner ring 91, it is difficult to perform super finishing (or lapping) etc. on such a rib face 99 due to its shape. This is one of the factors that increase manufacturing cost.

SUMMARY OF THE INVENTION

It is one object of the present invention to provide a tapered roller bearing capable of reducing friction resistance between large end faces of tapered rollers and a rib face of an inner ring even if the rib face of the inner ring which is to be slidingly contacted by the large end faces of the tapered rollers is not super-finished (or lapped) etc.

According to one aspect of the present invention, a tapered roller bearing includes: an inner ring having a tapered inner ring raceway surface; an outer ring having a tapered outer ring raceway surface; a plurality of tapered rollers configure to roll on the inner ring raceway surface and the outer race raceway surface and each having a large end face formed of a convex surface; and an annular cage that retains the plurality of tapered rollers at intervals in a circumferential direction, wherein the inner ring has a rib face that is provided on a larger diameter side of the inner ring and that contacts the large end face, and surface roughness of the rib face is greater than that of the large end face.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 9A shows the case where the difference in curvature radius therebetween is small, and FIG. 9B shows the case where the difference in curvature radius therebetween is large.

FIG. 10 is an illustration showing a contact ellipse in a conventional tapered roller bearing;

FIG. 11 is an illustration showing a contact ellipse in an embodiment of the present invention;

DETAILED DESCRIPTION OF EMBODIMENTS

Figure 1:
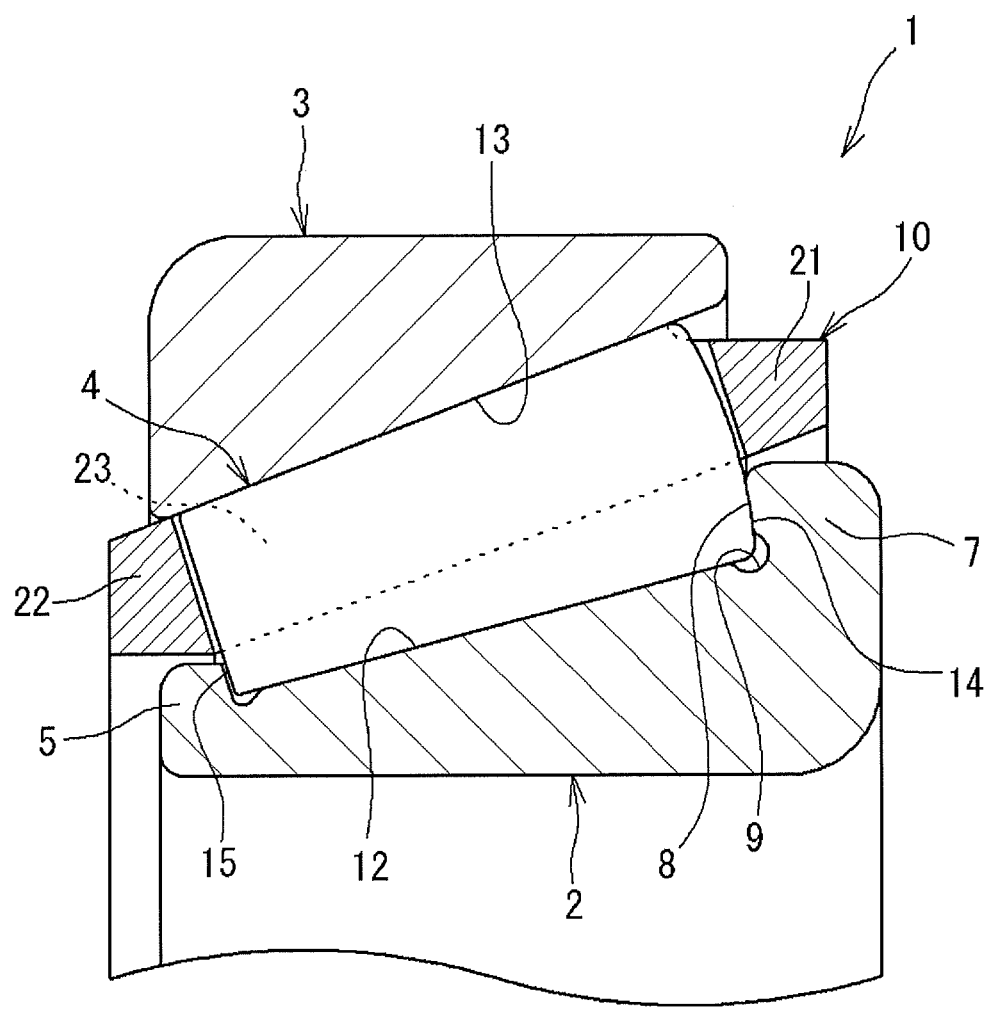
FIG. 1 is a longitudinal section showing an embodiment of a tapered roller bearing of the present invention.

Embodiments of the present invention will be described below with reference to the accompanying drawings. FIG. 1 is a longitudinal section showing an embodiment of a tapered roller bearing 1 of the present invention. The tapered roller bearing 1 includes an inner ring 2, an outer ring 3, a plurality of tapered rollers 4, and an annular cage 10. The outer ring 3 is disposed on the outer peripheral side of the inner ring 2 so as to be concentric with the inner ring 2. The tapered rollers 4 are arranged between the inner ring 2 and the outer ring 3. The cage 10 retains the tapered rollers 4 at intervals in the circumferential direction.

The inner ring 2 is an annular member made of bearing steel, steel for machine structural use, etc. The inner ring 2 has a tapered inner ring raceway surface 12 (a part of a conical surface) along its outer periphery. Like the inner ring 2, the outer ring 3 is also an annular member made of bearing steel, steel for machine structural use, etc. The outer ring 3 has a tapered outer ring raceway surface 13 (a part of a conical surface) along its inner periphery. The inner ring raceway surface 12 faces the outer ring raceway surface 13. When the tapered roller bearing 1 is rotated, the tapered rollers 4 roll on the inner ring raceway surface 12 and the outer ring raceway surface 13. The tapered rollers 4 are members made of bearing steel etc. and having the shape of a circular truncated cone. Each tapered roller 4 has a large end face 14 on one side in the axial direction and has a small end face 15 on the other side in the axial direction. The large end face 14 has a larger diameter, and the small end face 15 has a smaller diameter. The large end face 14 is a convex surface.

The inner ring 2 has a cone back face rib (hereinafter referred to as a large rib) 7. The large rib 7 is formed on the larger diameter side in the outer periphery of the inner ring 2. The large rib 7 adjoins one end of the inner ring raceway surface 12 in the axial direction and protrudes outward in the radial direction. A rib face 8 serving as an end face on the inner ring raceway surface 12 side of the large rib 7 is a concave surface. The rib face 8 is an annular surface as the large rib 7 has an annular shape. A grinding undercut portion (hereinafter referred to as a recessed portion) 9 having a concave shape in section is formed along the entire circumference in the corner between the inner ring raceway surface 12 and the rib face 8 of the inner ring 2. The inner ring 2 further has a cone front face rib (hereinafter referred to as a small rib) 5. The small rib 5 is formed on the smaller diameter side in the outer periphery of the inner ring 2. The small rib 5 adjoins the other end of the inner ring raceway surface 12 in the axial direction and protrudes outward in the radial direction.

Figure 3:
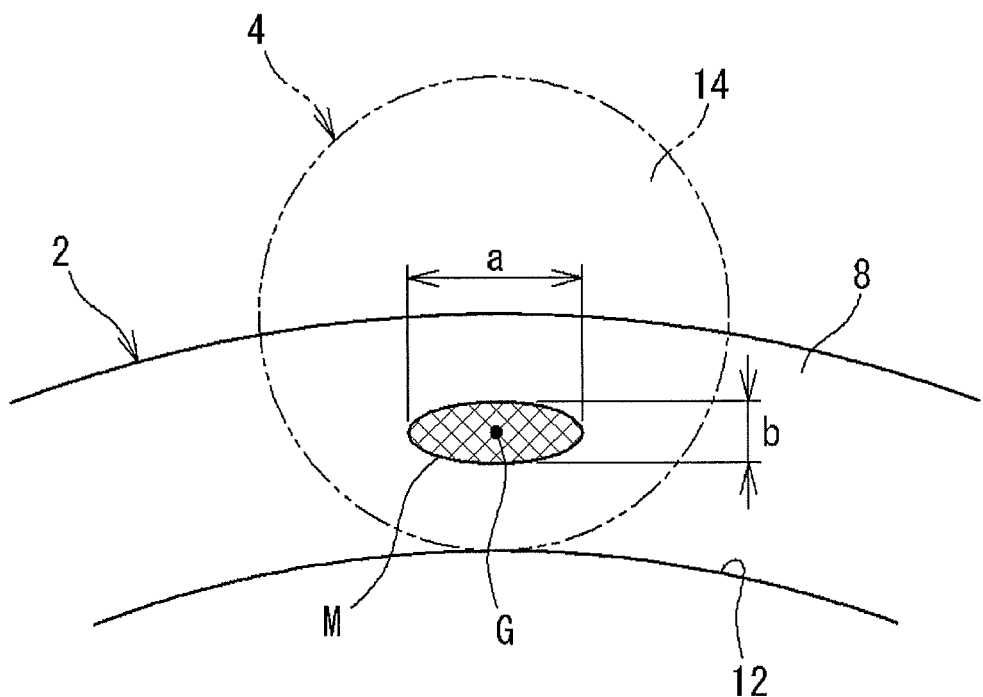
FIG. 3 is an illustration showing a contact ellipse that is formed by contact between the rib face of the inner ring and the large end face of the tapered roller.

The large end faces 14 of the tapered rollers 4 can contact the rib face 8. When the tapered roller bearing 1 is rotated, the tapered rollers 4 roll on the raceway surfaces 12, 13 and the rib face 8 slidingly contacts the large end faces 14. It is herein assumed that the inner ring 2 is rotated. The large end faces 14 are convex surfaces, and the rib face 8 is a concave surface. Accordingly, when the rib face 8 contacts (slidingly contacts) the large end faces 14, the contact surface (sliding-contact surface) between the rib face 8 and each of the large end faces 14 has an elliptical shape. That is, a contact ellipse M (see, e.g., FIG. 3) is formed between each of the large end faces 14 and the rib face 8. Lubricating oil (including grease) is supplied to the tapered roller bearing 1. When the tapered roller bearing 1 (the inner ring 2) is rotated, the lubricating oil flows in the circumferential direction along the annular rib face 8.

The cage 10 has a pair of annular portions 21, 22 and a plurality of bars 23. The bars 23 connect the annular portions 21, 22. Those regions surrounded by the annular portions 21, 22 and each pair of bars 23 adjacent to each other in the circumferential direction serve as pockets that accommodate the tapered rollers 4. This cage 10 can retain the plurality of tapered rollers 4 at intervals (regular intervals) in the circumferential direction. The above configuration is common to tapered roller bearings 1 of other embodiments described below.

Figure 2:
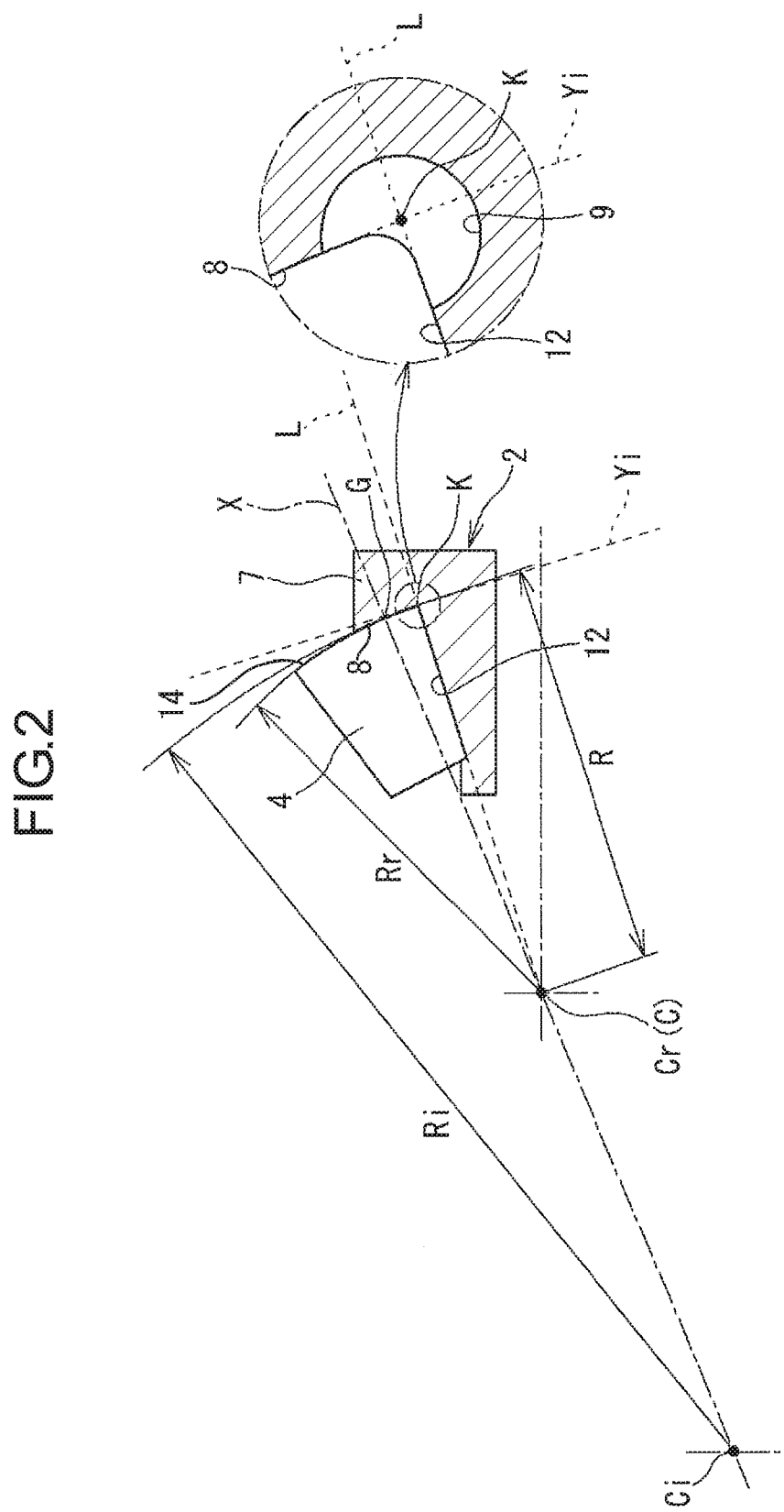
FIG. 2 is a diagram illustrating the shape of a rib face of an inner ring, the shape of a large end face of a tapered roller, etc.

FIG. 2 is a diagram illustrating the shape of the rib face 8 of the inner ring 2 and the shape of the large end face 14 of the tapered roller 4. As shown in FIG. 2, the shape of the rib face 8 of the inner ring 2 and the shape of the large end face 14 of the tapered roller 4 are set based on a distance R, where R represents the distance from a cone center C of the tapered roller 4 to a reference point K. FIG. 2 is a model diagram showing the tapered roller 4 (in section) superimposed on the longitudinal section of the inner ring 2. The longitudinal section of the inner ring 2 herein refers to a section including the center line of the inner ring 2.

As used herein, the reference point K refers to the intersection of an imaginary line L and the rib face 8 in the longitudinal section of the inner ring 2 (see FIG. 2). The imaginary line L is a line extending from the cone center C of the tapered roller 4 and along the inner ring raceway surface 12. This "rib face 8" includes an extended line Yi extended from the rib face 8 in the longitudinal section. In the present embodiment, the recessed portion 9 is formed as described above. The reference point K is therefore the intersection of the imaginary line L and the extended line Yi. The "cone center C" of the tapered roller 4 means the vertex of the conical shape of the tapered roller 4. The distance R is the distance between two points, namely the cone center C and the reference point K. For example, in the case where the cone center C has coordinates (0, 0) and the reference point K has coordinates (x, y) on the xy coordinate system, the distance R satisfies the relational expression of $R^2=x^2+y^2$.

The shape of the rib face 8 of the inner ring 2 and the shape of the large end face 14 of the tapered roller 4 will be described below. In the longitudinal section of the inner ring 2, a curvature radius Ri of the rib face 8 is set to a value larger than the distance R (Ri>R). Preferably, the curvature radius Ri of the rib face 8 is set so as to satisfy the relationship of 100%<Ri≤300% with respect to the distance R (100% of R<Ri≤300% of R). A curvature radius Rr of the large end face 14 of the tapered roller 4 is set to a value that is the same as or smaller than the distance R (Ri≤R). Preferably, the curvature radius Rr of the large end face 14 is set to a value in the range of 80 to 100% of the distance R (80% of R≤Rr≤100% of R). The curvature radius Rr of the large end face 14 is also set to a value smaller than the curvature radius Ri of the rib face 8 (Rr<Ri). In FIG. 2, the center Cr of curvature of the large end face 14 coincides with the cone center C.

As described above, the curvature radius Ri of the rib face 8 of the inner ring 2 is set to a value larger than the distance R, and the curvature radius Rr of the large end face 14 of the tapered roller 4 is set to a value that is the same as or smaller than the distance R. The relationship of "Ri>R≥Rr" is thus satisfied.

In the present embodiment, the center G of the contact ellipse M (crosshatched region shown in FIG. 3) formed by contact between the large end face 14 and the rib face 8 is located on an imaginary straight line X passing through the center Cr of curvature of the large end face 14 and the center Ci of curvature of the rib face 8. As shown in FIG. 2, the center G of the contact ellipse M is thus located near the center of the rib face 8 in the radial direction.

According to the above configuration, the center G of the contact ellipse M formed by contact between the large end face 14 and the rib face 8 is located on the imaginary straight line X passing through the center Cr of curvature of the large end face 14 of the tapered roller 4 and the center Ci of curvature of the rib face 8 of the inner ring 2. The center G of the contact ellipse M can thus be located near the center in the radial direction of the rib face 8 of the inner ring 2. This can suppress contact of the large end face 14 with the outer and inner corners in the radial direction of the rib face 8, and can therefore effectively prevent an edge load between the large end face 14 of the tapered roller 4 and the rib face 8 of the inner ring 2.

In the tapered roller bearing 1 of the present embodiment, surface roughness σ2 of the rib face 8 of the inner ring 2 is greater than surface roughness σ1 of the large end face 14 of each tapered roller 4 (σ2>σ1). Specifically, the surface roughness (arithmetic average roughness) σ2 of the rib face 8 is preferably 0.1 μmRa or more and 0.5 μmRa or less. On the other hand, the surface roughness (arithmetic average roughness) a1 of the large end face 14 of the tapered roller 4 is preferably less than 0.1 μmRa and 0.01 μmRa or more. Since the surface roughness σ2 of the rib face 8 is 0.1 μmRa or more, the rib face 8 can be a ground surface produced by grinding. The large end face 14 of the tapered roller 4 is also a ground surface.

Figure 4:
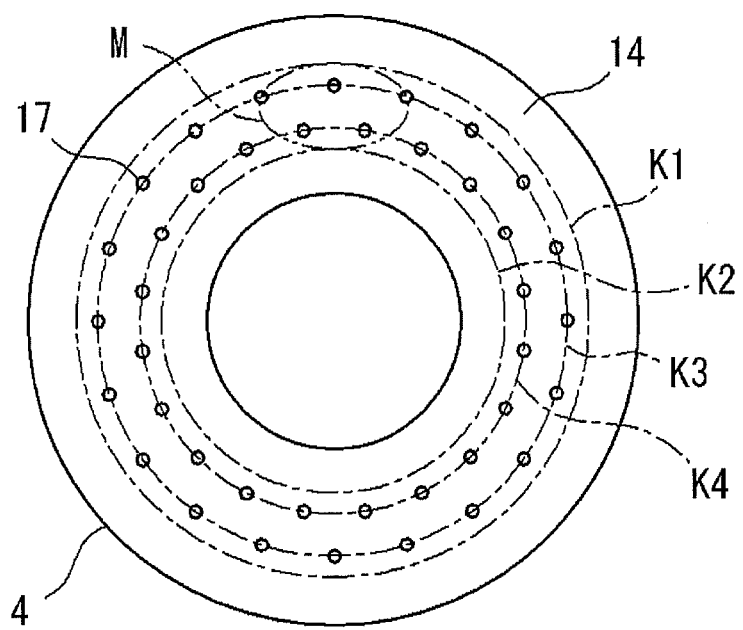
FIG. 4 is a diagram showing the large end face of the tapered roller as viewed in the axial direction.

As shown in FIG. 4, in the tapered roller bearing 1 of the present embodiment, the large end face 14 of the tapered roller 4 has a plurality of recesses 17. All of the recesses 17 are formed within the range of the contact ellipse M formed by contact between the large end face 14 and the rib face 8. FIG. 4 shows the large end face 14 of the tapered roller 4 as viewed in the axial direction. In FIG. 4, the contact ellipse M is shown by a long dashed double-short dashed line. When the tapered roller bearing 1 (the inner ring 2) is rotated, the tapered rollers 4 roll between the inner ring 2 and the outer ring 3. The contact ellipse M is thus formed in an annular region on the large end face 14 of each tapered roller 4. In FIG. 4, this annular region is a region between a first imaginary circle K1 and a second imaginary circle K2, and the recesses 17 are formed in this annular region.

In the embodiment shown in FIG. 4, the recesses 17 are very small recessed portions having a shape conforming to a part of a spherical surface. In the large end face 14, the plurality of recesses 17 are formed along a third imaginary circle K3 and a fourth imaginary circle K4 which are located between the first and second imaginary circles K1, K2. For example, the recesses 17 are formed by punching, and the large end face 14 is ground after punching.

Figure 5:
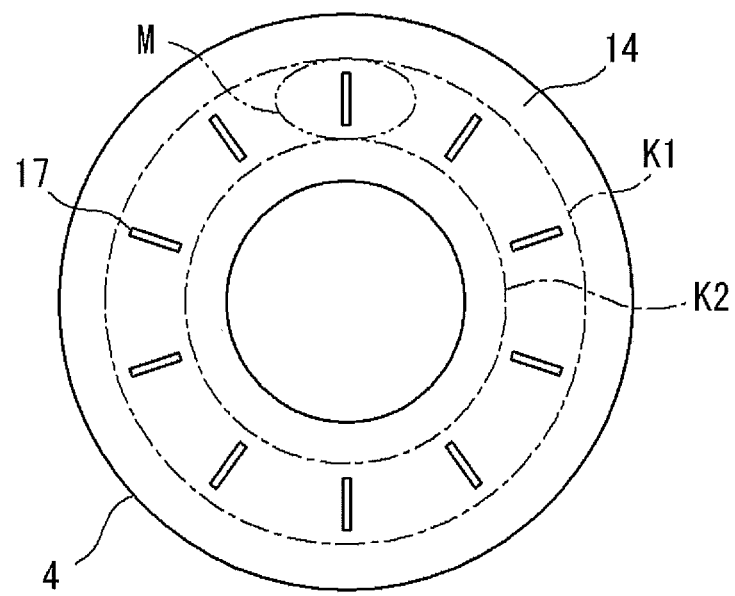
FIG. 5 is a diagram showing the large end face of the tapered roller as viewed in the axial direction.

The recesses 17 may be in other forms. For example, as shown in FIG. 5, the recesses 17 may be elongated grooves (grooves in a radial pattern) that are elongated in the radial direction. In this case as well, the recesses 17 are formed in the region between the first and second imaginary circles K1, K2.

In the forms shown in FIGS. 4 and 5, the recesses 17 are formed in the region between the first and second imaginary circles K1, K2. The lubricating oil held in the recesses 17 can thus stay in the range of the contact ellipse M. The surface roughness a1 (less than 0.1 μmRa) of the large end face 14 of the tapered roller 4 is the surface roughness of the large end face 14 other than the recesses 17.

According to the above configuration, when the tapered roller bearing 1 (in the present embodiment, the inner ring 2) is rotated, each tapered roller 4 rolls on the inner ring raceway surface 12. Accordingly, the rib face 8 and the large end face 14 of each tapered roller 4 theoretically do not slide on each other at the intersection of the inner ring raceway surface 12 and the rib face 8 (the reference point K), namely at the inner peripheral end position of the rib face 8. In the tapered roller bearing 1 of the present embodiment, however, the large end face 14 of each tapered roller 4 partially contacts the rib face 8 (in the range of the contact ellipse M shown in FIG. 3) at a position radially outward of the inner peripheral end position (the reference point K). At this position radially outward of the inner peripheral end position, the rib face 8 (the inner ring 2) rotates faster than the large end face 14 of the tapered roller 4 based on the rotational speed at the inner peripheral end position. The rib face 8 and the large end face 14 of the tapered roller 4 thus contact each other while sliding on each other (slidingly contact each other) due to this difference in speed.

Figure 6:
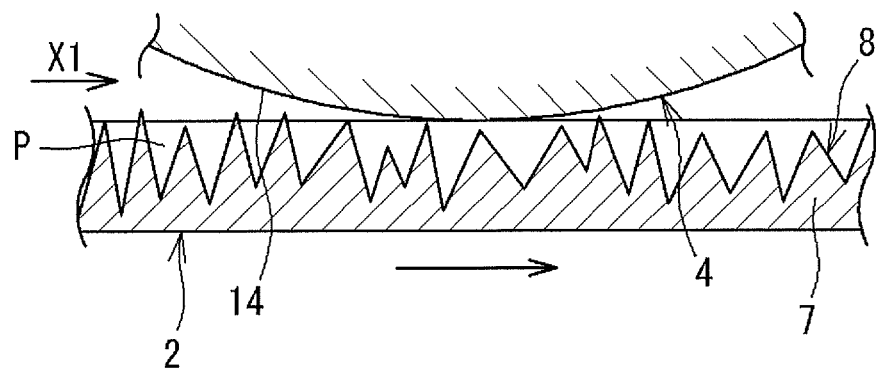
FIG. 6 is a conceptual diagram illustrating a contact portion between the rib face of the inner ring and the large end face of the tapered roller.

In the tapered roller bearing 1 of the present embodiment, the surface roughness σ2 of the rib face 8 that rotates faster is made greater than the surface roughness σ1 of the large end face 14 of each tapered roller 4 which is a ground surface (σ2>σ1). This improves the capability of the rib face 8 to draw the lubricating oil that is present therearound. That is, since the rib face 8 has great surface roughness σ2, the rib face 8 can catch the lubricating oil that is present therearound. As shown in the conceptual diagram of FIG. 6, as the inner ring 2 is rotated, the lubricating oil P caught by the rib face 8 can be supplied between the rib face 8 and the large end face 14 of each tapered roller 4. In FIG. 6, the rib face 8 is rotating faster than the large end face 14, and the lubricating oil P to be supplied therefore flows in the direction shown by an arrow X1.

The present embodiment satisfies "Ri>R≥Rr" (see FIG. 2) as described above. The contact ellipse M formed by contact between the large end face 14 of the tapered roller 4 and the rib face 8 of the inner ring 2 is therefore an ellipse that is short in the circumferential direction of the inner ring 2 (the rib face 8) and is long in the direction perpendicular to the circumferential direction. That is, ellipticity of the contact ellipse M can be increased. The ellipticity of the contact ellipse M (see FIG. 3) is the ratio (b/a) of the dimension (vertical width) b of the contact ellipse M in the radial direction of the annular rib face 8 to the dimension (horizontal width) a in the tangential direction to an imaginary circle passing through the ellipse center G on the annular rib face 8.

When the inner ring 2 is rotated, the lubricating oil on the rib face 8 flows in the circumferential direction of the inner ring 2. The flow of the lubricating oil that is caught by the rib face 8 and supplied between the rib face 8 and the large end face 14 of each tapered roller 4 is therefore restricted in a wide range (the range of the dimension b) due to the shape of the contact ellipse M. This increases the thickness of an oil film between the large end face 14 of each tapered roller 4 and the rib face 8 of the inner ring 2. The lubricating oil that is supplied between the rib face 8 and the large end face 14 of each tapered roller 4 can thus reduce friction resistance between the rib face 8 and the large end face 14 of each tapered roller 4 even if the surface roughness of the rib face 8 of the inner ring 2 is not significantly reduced by, e.g., super finishing etc. as in conventional examples. This eliminates the need for super finishing etc. of the rib face 8, whereby manufacturing cost of the tapered roller bearing 1 can be reduced.

The ellipticity of the contact ellipse M is preferably 0.2 or more, and more preferably 0.3 or more. As in a second embodiment described below, the ellipticity of the contact ellipse M may be larger than 1. By increasing the ellipticity, the flow of the lubricating oil in the circumferential direction (along the rib face 8) can be restricted in a wide range, and the thickness of the oil film can be increased.

In the present embodiment, the plurality of recesses 17 are formed in a predetermined range of the large end face 14 as described above (see FIGS. 4, 5). The lubricating oil caught by the rib face 8 and supplied between the rib face 8 and the large end face 14 can thus be held in the recesses 17. This can further improve lubrication performance between the rib face 8 and the large end face 14.

Since the general configuration of a tapered roller bearing according to the second embodiment is similar to that of the tapered roller bearing 1 according to the first embodiment, description thereof will be omitted. The second embodiment is different from the first embodiment in the shape of the rib face 8 of the inner ring 2 and the shape of the large end face 14 of each tapered roller 4. This difference will be described below.

Figure 7:
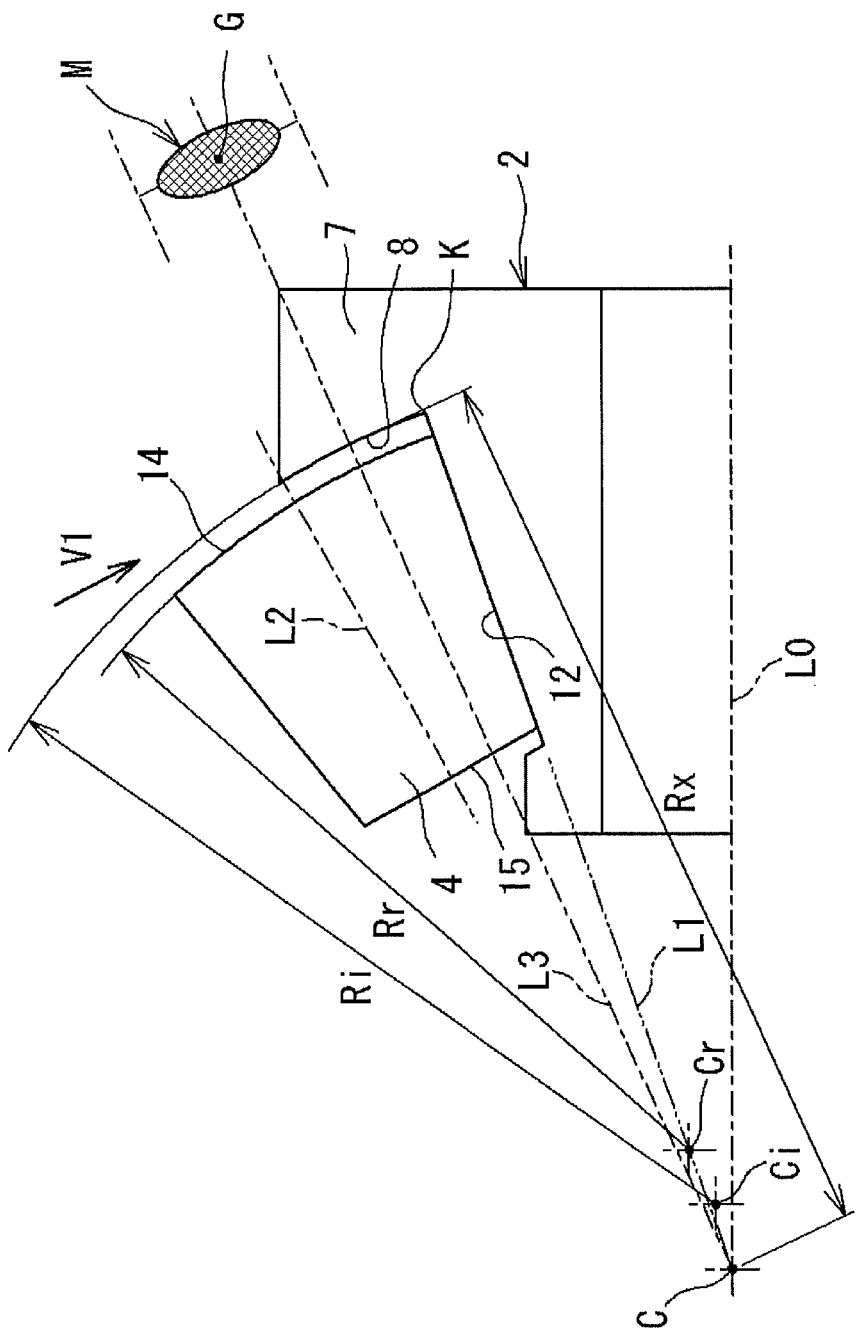
FIG. 7 is a diagram illustrating the shape of the rib face of the inner ring, the shape of the large end face of the tapered roller, etc.

FIG. 7 is a diagram illustrating the shape of the rib face 8 of the inner ring 2, the shape of the large end face 14 of each tapered roller 4, etc. FIG. 7 is a model diagram showing the tapered roller 4 (in section) superimposed on the longitudinal section of the inner ring 2. For illustration, the shape of each part is shown in a simplified manner in FIG. 7. The large end face 14 of the tapered roller 4 is actually in contact with the rib face 8 of the inner ring 2. For illustration, however, the large end face 14 of the tapered roller 4 is shown separated from the rib face 8 of the inner ring 2 in FIG. 7. The longitudinal section of the inner ring 2 herein refers to a section including the center line LO of the inner ring 2.

The large end face 14 is a part of a spherical surface, and Rr represents the curvature radius of this large end face 14. The large end face 14 therefore has the curvature radius Rr in a longitudinal section of the tapered roller 4 (FIG. 7) which is in the same section as the longitudinal section of the inner ring 2. The large end face 14 also has the curvature radius Rr in a section perpendicular to the longitudinal section (FIG. 7) and passing through the center line L2 of the tapered roller 4.

Figure 8:
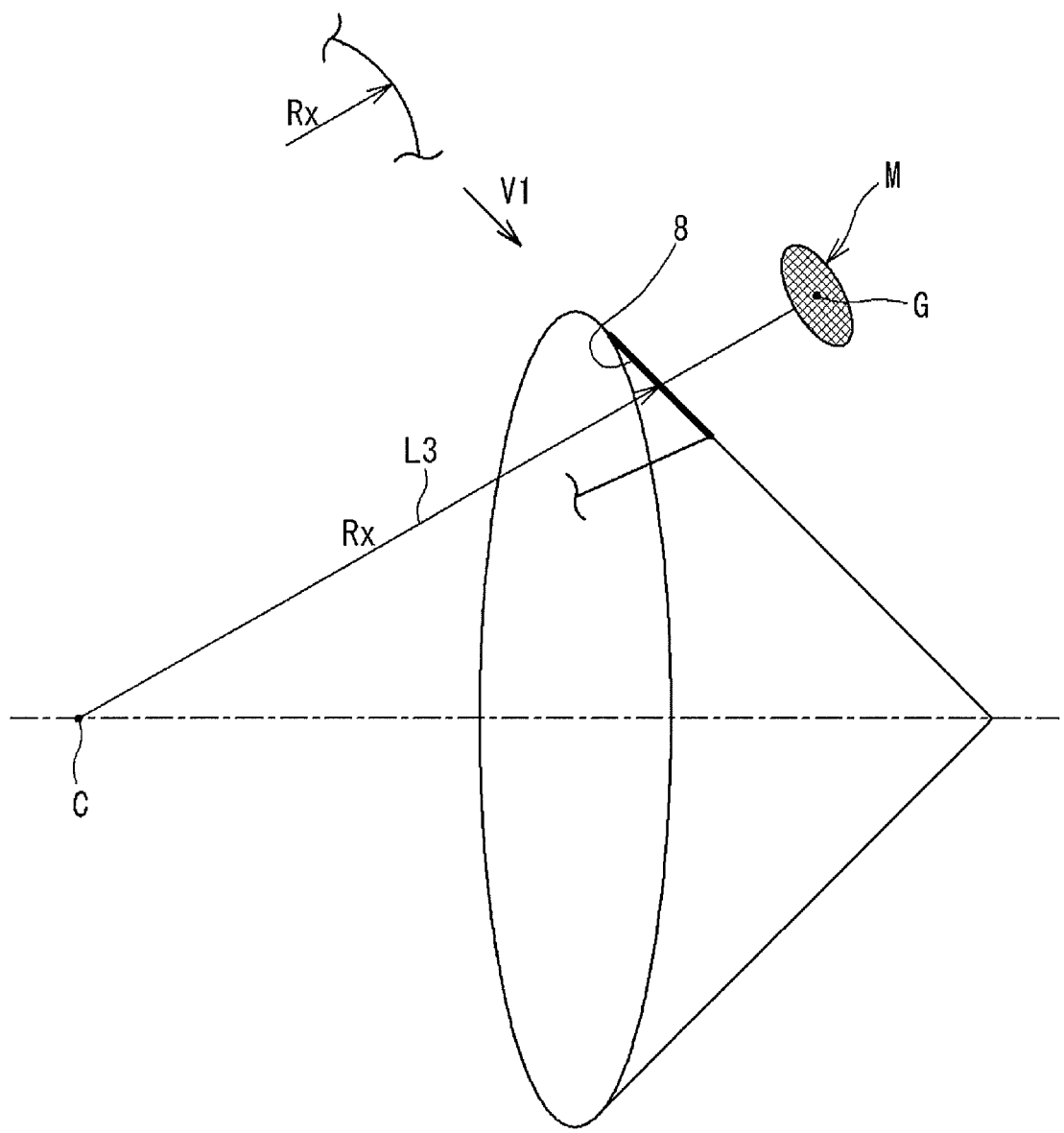
FIG. 8 is a schematic diagram illustrating the shape of the rib face.

Ri represents the curvature radius of the rib face 8 in the longitudinal section of the inner ring 2 (FIG. 7). FIG. 8 is a schematic diagram illustrating the shape of the rib face 8. As described above, the rib face 8 has the curvature radius Ri in the longitudinal section of the inner ring 2 (FIG. 7). As shown in FIG. 8, however, the rib face 8 has a curvature radius Rx as viewed radially inward in the direction perpendicular to an imaginary line L3 (the direction shown by an arrow V1; hereinafter referred to as an imaginary radial direction). The imaginary line L3 is a line connecting the cone center C and the center G of the contact ellipse M. The rib face 8 therefore has two curvature radii Ri, Rx depending on the direction in which the rib face 8 is viewed.

In FIG. 7, Rx represents the distance from the cone center C to the center G of the contact ellipse M formed by contact between the large end face 14 and the rib face 8. The cone center C is the cone center of the tapered roller 4 and means the vertex of the conical shape of the tapered roller 4. The cone center C is also the intersection of an extended line L1 of the inner ring raceway surface 12 and the center line LO of the inner ring 2 in the longitudinal section of the inner ring 2. The cone center C, the center Cr of the large end face 14, and the center Ci of the rib face 8 are located at different positions. The center Cr is located on an extended line of the center line L2 of the tapered roller 4.

This tapered roller bearing 1 satisfies "Rx>Ri>Rr." As shown in FIG. 11, the contact ellipse M formed by contact between the large end face 14 of the tapered roller 4 and the rib face 8 of the inner ring 2 is therefore an ellipse that is short in the circumferential direction of the inner ring 2 and is long in the direction perpendicular to the circumferential direction (the perpendicular direction to the circumferential direction). This will be described later.

As in the first embodiment, in the tapered roller bearing 1 of the present embodiment, the surface roughness σ2 of the rib face 8 of the inner ring 2 is greater than the surface roughness σ1 of the large end face 14 of each tapered roller 4 (σ2>σ1). Specifically, the surface roughness (arithmetic average roughness) σ2 of the rib face 8 is preferably 0.1 μmRa or more and 0.5 μmRa or less. On the other hand, the surface roughness (arithmetic average roughness) σ1 of the large end face 14 of the tapered roller 4 is preferably less than 0.1 μmRa and 0.01 μmRa or more. Since the surface roughness σ2 of the rib face 8 is 0.1 μmRa or more, the rib face 8 can be a ground surface produced by grinding. The large end face 14 of the tapered roller 4 is also a ground surface.

As in the first embodiment, in the tapered roller bearing 1 of the present embodiment, the large end face 14 of the tapered roller 4 has the plurality of recesses 17, as shown in FIG. 4 (or FIG. 5). All of the recesses 17 are formed within the range of the contact ellipse M formed by contact between the large end face 14 and the rib face 8.

The relationship between "Rx>Ri>Rr" and the shape of the contact ellipse M will be described below. As described above, the large end face 14 of the tapered roller 4 is a part of a spherical surface. The large end face 14 therefore has the curvature radius Rr in the longitudinal section of the inner ring 2 (FIG. 7). The large end face 14 also has the curvature radius Rr in the section perpendicular to this longitudinal section and passing through the center line L2 of the tapered roller 4. The rib face 8 of the large rib 7 has the curvature radius Ri in the longitudinal section of the inner ring 2 (see FIG. 7). However, the rib face 8 of the inner ring 2 has the curvature radius Rx as viewed radially inward in the direction perpendicular to the imaginary line L3 connecting the cone center C and the center G of the contact ellipse M (the direction shown by the arrow V1) (see FIG. 8).

Simple examples of how the large end face 14 (convex surface) of the tapered roller 4 contacts the rib face 8 (concave surface) of the inner ring 2 will be described by using a generalized convex surface F and a generalized convex surface f shown in FIGS. 9A, 9B.

Figure 9A:
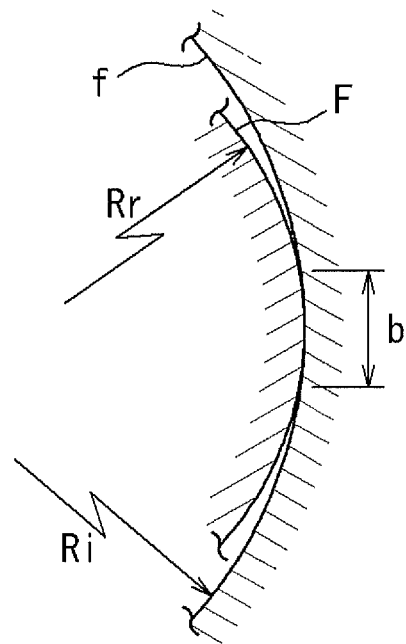
FIGS. 9A and 9B are illustrations showing the contact width between a convex surface (large end face) and a concave surface (rib face), where

As shown in FIG. 9A, the convex surface F has a curvature radius Rr, and the concave surface f has a curvature radius Ri. For example, in the case where the curvature radius Rr of the convex surface F is "1,000" and the curvature radius Ri of the concave curve f is "1,003," the difference β1 between the curvature radii Rr, Ri is 3 (=1,003−1,000). In FIG. 9B, the convex surface F has the same curvature radius Rr as in FIG. 9A, but the concave surface f has a curvature radius Rx (larger than Ri). For example, in the case where the curvature radius Rr of the convex surface F is "1,000" and the curvature radius Rx of the concave curve f is "1,005" in FIG. 9B, the difference δ2 between the curvature radii Rr, Rx is 5 (=1,005−1,000).

Figure 9B:
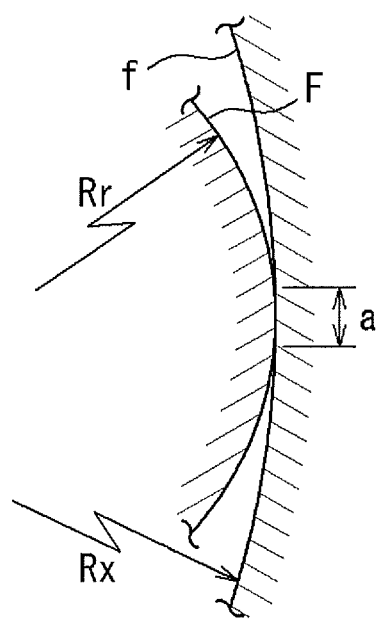

As in the case of FIG. 9A, if the difference δ1 (=3) between the curvature radii Rr, Ri is small (as compared to the difference δ2 (=5) between the curvature radii Rr, Rx in FIG. 9B), the contact width (contact length) b between the convex surface F and the concave surface f is large (as compared to the case of FIG. 9B). As in the case of FIG. 9B, if the difference δ2 (=5) between the curvature radii Rr, Rx is large (as compared to the difference δ1 (=3) between the curvature radii Rr, Ri in FIG. 9A), the contact width (contact length) a between the convex surface F and the concave surface f is small (as compared to the case of FIG. 9A) (a<b).

That is, in the case where the convex surface F and the concave curve f which have different curvature radii contact each other, the contact width b between the convex surface F and the concave surface f is relatively large (wide) if the difference between the curvature radius of the convex surface F and the curvature radius of the concave surface f is small (FIG. 9A). However, the contact width a between the convex surface F and the concave surface f is relatively small (narrow) if the difference between the curvature radius of the convex surface F and the curvature radius of the concave surface f is large (FIG. 9B). The smaller the difference between the curvature radius of the convex surface F and the curvature radius of the concave surface f is, the larger the contact width b is. The larger the difference between the curvature radius of the convex surface F and the curvature radius of the concave surface f is, the smaller the contact width a is.

The present embodiment will be described in view of the above description of the generalized case. The present embodiment (see FIG. 7) satisfies the relationship of "Rx>Ri>Rr" as described above. That is, the distance (curvature radius) Rx from the cone center C to the center G of the contact ellipse M and the curvature radius Ri of the rib face 8 are larger than the curvature radius Rr of the large end face 14 of the tapered roller 4 (Rx>Rr, Ri>Rr). Moreover, Rx is larger than Ri (Rx>Ri). In the case where the forms shown in FIGS. 9A, 9B are applied to the present embodiment, FIG. 9A corresponds to the longitudinal section of the inner ring 2 (FIG. 7), and FIG. 9B corresponds to the section as viewed in the imaginary radial direction (the direction shown by the arrow V1 in FIGS. 7, 8).

The width dimension b of the contact ellipse M in the longitudinal section of the inner ring 2 (FIG. 9A) is larger than the width dimension a of the contact ellipse M in the section as viewed in the imaginary radial direction (FIG. 9B). That is, as shown in FIG. 11, the contact ellipse M formed by contact between the large end face 14 of the tapered roller 4 and the rib face 8 of the inner ring 2 is an ellipse that is short in the circumferential direction of the inner ring 2 and is long in the direction perpendicular to the circumferential direction. The contact ellipse M that is longer in the direction perpendicular to the circumferential direction of the inner ring 2 than in the circumferential direction of the inner ring 2 is thus formed between the rib face 8 of the inner ring 2 and the large end face 14 of the tapered roller 4. The ellipticity (b/a) of the contact ellipse M is larger than 1 (ellipticity >1).

A contact ellipse of a conventionally used tapered roller bearing will be described. A tapered roller bearing is proposed in which a rib face of an inner ring is a concave surface in a longitudinal section of the inner ring as disclosed in Japanese Utility Model Application Publication No. H05-75520. However, a rib face of an inner ring is typically a flat surface rather than a concave surface in currently commercially available tapered roller bearings. In this case, the curvature radius Ri (see FIG. 7) of the rib face of the inner ring is infinite. According to FIGS. 9A, 9B, since the curvature radius Ri is infinite, Rr<Ri, and Rx<Ri, the width dimension b of the contact ellipse M is smaller than the width dimension a of the contact ellipse M (b<a). The contact ellipse M is therefore an ellipse that is long in the circumferential direction of the inner ring and is short in the direction perpendicular to the circumferential direction of the inner ring. The ellipticity of the contact ellipse M is thus smaller than 1 (ellipticity <1). The ellipticity is less than 0.2 in conventional typical tapered roller bearings.

On the other hand, in the present embodiment, the contact ellipse M formed by contact between the large end face 14 of the tapered roller 4 and the rib face 8 of the inner ring 2 is an ellipse that is short in the circumferential direction of the inner ring 2 and is long in the direction perpendicular to the circumferential direction (see FIG. 11), as described above. That is, the ellipticity is larger than 1. As described above, when the tapered roller bearing 1 is rotated, the lubricating oil on the rib face 8 flows in the circumferential direction of the inner ring 2. According to the shape of the contact ellipse M of the present embodiment (see FIG. 11), the flow of the lubricating oil is restricted in a wide range (the range of the contact width b) of the rib face 8. This increases the thickness of an oil film between the large end face 14 of the tapered roller 4 and the rib face 8 of the inner ring 2, and can thus effectively reduce friction resistance between the large end face 14 of the tapered roller 4 and the rib face 8 of the inner ring 2.

According to the conventional example shown in FIG. 10, the contact ellipse M is an ellipse that is long in the circumferential direction and is short in the direction perpendicular to the circumferential direction. Almost all of the lubricating oil flowing along the rib face 8 therefore passes the contact ellipse M, and the tapered roller bearing of the conventional example therefore hardly functions to increase the thickness of the oil film.

According to the above configuration, when the tapered roller bearing 1 (in the present embodiment, the inner ring 2) is rotated, each tapered roller 4 rolls on the inner ring raceway surface 12. Accordingly, the rib face 8 and the large end face 14 of each tapered roller 4 theoretically do not slide on each other at the intersection of the inner ring raceway surface 12 and the rib face 8 (the reference point K), namely at the inner peripheral end position of the rib face 8. In the tapered roller bearing 1 of the present embodiment, however, the large end face 14 of each tapered roller 4 partially contacts the rib face 8 (in the range of the contact ellipse M shown in FIG. 11) at a position radially outward of the inner peripheral end position (the reference point K). At this position radially outward of the inner peripheral end position, the rib face 8 (the inner ring 2) rotates faster than the large end face 14 of the tapered roller 4 based on the rotational speed at the inner peripheral end position. The rib face 8 and the large end face 14 of the tapered roller 4 thus contact each other while sliding on each other (slidingly contact each other) due to this difference in speed.

In the tapered roller bearing 1 of the present embodiment, the surface roughness σ2 of the rib face 8 that rotates faster is made greater than the surface roughness σ1 of the large end face 14 of each tapered roller 4 which is a ground surface (σ2>σ1). This improves the capability of the rib face 8 to draw the lubricating oil that is present therearound. That is, since the rib face 8 has greater surface roughness σ2, the rib face 8 can catch the lubricating oil that is present therearound. As shown in the conceptual diagram of FIG. 6, as the inner ring 2 is rotated, the lubricating oil caught by the rib face 8 can be supplied between the rib face 8 and the large end face 14 of each tapered roller 4.

The present embodiment satisfies "Rx>Ri>Rr" (see FIGS. 7, 8) as described above. The contact ellipse M formed by contact between the large end face 14 of the tapered roller 4 and the rib face 8 of the inner ring 2 is therefore an ellipse that is short in the circumferential direction of the inner ring 2 (the rib face 8) and is long in the direction perpendicular to the circumferential direction. That is, the ellipticity of the contact ellipse M can be increased. The ellipticity of the contact ellipse M is the ratio (b/a) of the dimension (vertical width) b of the contact ellipse M in the radial direction of the annular rib face 8 to the dimension (horizontal width) a in the tangential direction to the imaginary circle passing through the ellipse center G on the annular rib face 8.

When the inner ring 2 is rotated, the lubricating oil on the rib face 8 flows in the circumferential direction of the inner ring 2. The flow of the lubricating oil that is caught by the rib face 8 and supplied between the rib face 8 and the large end face 14 of each tapered roller 4 is therefore restricted in a wide range (the range of the dimension b) due to the shape of the contact ellipse M. This increases the thickness of the oil film between the large end face 14 of each tapered roller 4 and the rib face 8 of the inner ring 2. In particular, since the ellipticity of the contact ellipse M is larger than 1, the flow of the lubricating oil in the circumferential direction (along the rib face 8) can be restricted in a wide range, and the thickness of the oil film can be increased.

The lubricating oil that is supplied between the rib face 8 and the large end face 14 of each tapered roller 4 can thus reduce friction resistance between the rib face 8 and the large end face 14 of each tapered roller 4 even if the surface roughness of the rib face 8 of the inner ring 2 is not significantly reduced by, e.g., super finishing etc. as in conventional examples. This eliminates the need for super finishing etc. of the rib face 8, whereby manufacturing cost of the tapered roller bearing 1 can be reduced.

In the present embodiment, the plurality of recesses 17 are formed in a predetermined range of the large end face 14 as described above (see FIGS. 4, 5). The lubricating oil caught by the rib face 8 and supplied between the rib face 8 and the large end face 14 can thus be held in the recesses 17. This can further improve lubrication performance between the rib face 8 and the large end face 14.

Figure 12:
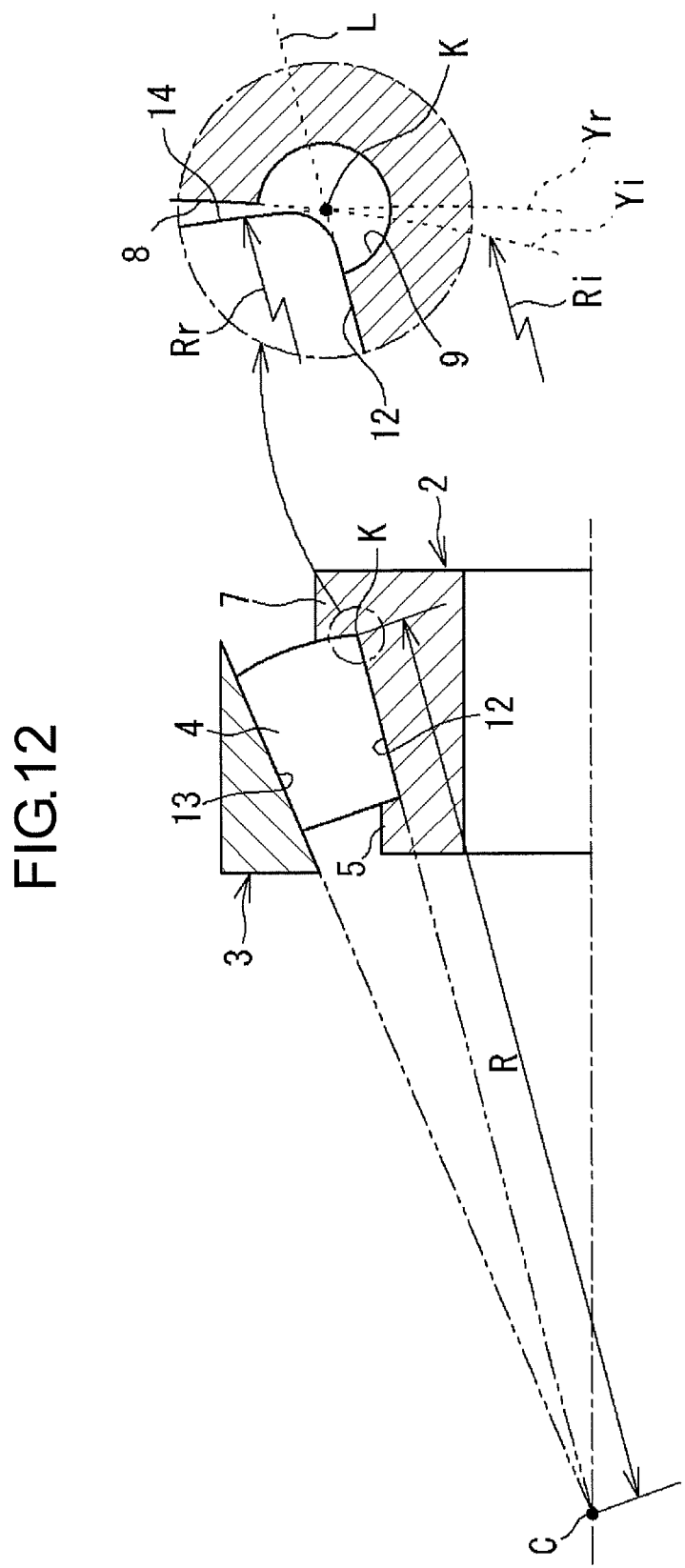
FIG. 12 is an illustration showing a modification of a first embodiment shown in FIG. 2.

FIG. 12 is an illustration showing a modification of the first embodiment (FIG. 2). Since the general configuration of a tapered roller bearing shown in FIG. 12 (third embodiment) is similar to that of the tapered roller bearing 1 of the first embodiment, description thereof will be omitted. The third embodiment is different from the first embodiment in the shape of the rib face 8 of the inner ring 2 and the shape of the large end face 14 of each tapered roller 4. This difference will be described below. FIG. 12 is a diagram illustrating the shape of the rib face 8 of the inner ring 2, the shape of the large end face 14 of the tapered roller 4, etc. FIG. 12 is a model diagram showing the tapered roller 4 (in section) superimposed on the longitudinal section of the inner ring 2. The longitudinal section of the inner ring 2 herein refers to a section including the center line of the inner ring 2.

The shape of the rib face 8 of the inner ring 2 and the shape of the large end face 14 of the tapered roller 4 will be described below. R represents the distance from the cone center C of the tapered roller 4 to a predetermined reference point K separated from the inner ring raceway surface 12 in the direction along the inner ring raceway surface 12. In this case, the shape of the rib face 8 of the inner ring 2 and the shape of the large end face 14 of the tapered roller 4 are set based on the reference point K and the distance R.

The rib face 8 of the inner ring 2 is formed at such a position that the rib face 8 passes through the reference point K. The curvature radius Ri of the rib face 8 is set in the range of 100 to 120% of the distance R (Ri≥R). Since the recessed portion 9 is formed in the present embodiment, the rib face 8 "passing through the reference point K" includes not only the case where the rib face 8 actually passes through the reference point K, but also the case where the extended line Yi of the rib face 8 passes through the reference point K. The "reference point K" is therefore the intersection of the inner ring raceway surface 12 or the extended line L thereof and the rib face 8 or the extended line Yi thereof. In the present embodiment, the extended line Yi of the rib face 8 passes through the reference point K.

The large end face 14 of the tapered roller 4 is formed at such a position that the large end face 14 passes through the reference point K. The curvature radius Rr of the large end face 14 is set in the range of 80 to 100% of the distance R (Rr≤R). The large end face 14 "passing through the reference point K" includes not only the case where the large end face 14 actually passes through the reference point K, but also the case where the extended line Yr of the large end face 14 passes through the reference point K. In the present embodiment, the extended line Yr of the large end face 14 passes through the reference point K. In the present embodiment, the curvature radius Ri of the rib face 8 and the curvature radius Rr of the large end face 14 satisfy the relationship of "R=(Ri+Rr)/2." The present embodiment satisfies "Ri>R≥Rr."

Figure 13:
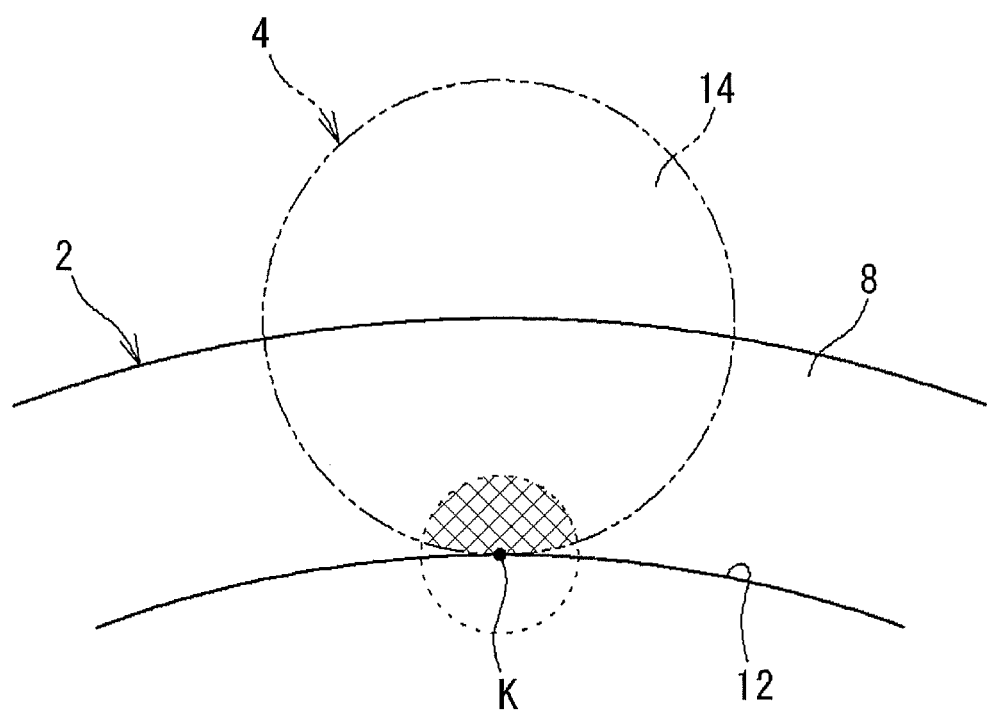
FIG. 13 is an illustration showing a contact portion between the rib face of the inner ring and the large end face of the tapered roller.

According to the above configuration, as shown in FIG. 13, the large end face 14 of the tapered roller 4 slidingly contacts the radially inner end of the rib face 8 of the inner ring 2, which is a part (crosshatched region in the figure) of the range of an imaginary circle about the reference point K. This can reduce the range in which the large end face 14 slidingly contacts the rib face 8 (the range in which the large end face 14 and the rib face 8 contact each other while sliding on each other) as compared to the case where the large end face 14 slidingly contacts a radially outer part of the rib face 8. Sliding friction between the large end face 14 of the tapered roller 4 and the rib face 8 of the inner ring 2 can therefore be effectively reduced.

In the tapered roller bearing 1 of the present embodiment, the surface roughness σ2 of the rib face 8 of the inner ring 2 is greater than the surface roughness σ1 of the large end face 14 of each tapered roller 4 (σ2>σ1). Specifically, the surface roughness (arithmetic average roughness) σ2 of the rib face 8 is preferably 0.1 μmRa or more and 0.5 μmRa or less. On the other hand, the surface roughness (arithmetic average roughness) σ1 of the large end face 14 of the tapered roller 4 is preferably less than 0.1 μm Ra and 0.01 μmRa or more. Since the surface roughness σ2 of the rib face 8 is 0.1 μmRa or more, the rib face 8 can be a ground surface produced by grinding. The large end face 14 of the tapered roller 4 is also a ground surface.

As in the first embodiment, in the tapered roller bearing 1 of the present embodiment, the large end face 14 of the tapered roller 4 has the plurality of recesses 17, as shown in FIG. 4 (or FIG. 5). All of the recesses 17 are formed within the range of the contact ellipse M formed by contact between the large end face 14 and the rib face 8.

According to the above configuration, when the tapered roller bearing 1 (in the present embodiment, the inner ring 2) is rotated, each tapered roller 4 rolls on the inner ring raceway surface 12. Accordingly, the rib face 8 and the large end face 14 of each tapered roller 4 theoretically do not slide on each other at the intersection of the inner ring raceway surface 12 and the rib face 8 (the reference point K), namely at the inner peripheral end position of the rib face 8. As shown in FIG. 13, in the tapered roller bearing 1 of the present embodiment, the large end face 14 of the tapered roller 4 slidingly contacts the radially inner end of the rib face 8, which is a part (crosshatched region in the figure) of the range of the imaginary circle about the reference point K, as described above. Sliding friction between the large end face 14 and the rib face 8 is thus reduced.

The surface roughness σ2 of the rib face 8 is made greater than the surface roughness σ1 of the large end face 14 of each tapered roller 4 which is a ground surface (σ2>σ1). This improves the capability of the rib face 8 to draw the lubricating oil that is present therearound. That is, since the rib face 8 has greater surface roughness σ2, the rib face 8 can catch the lubricating oil that is present therearound. As shown in the conceptual diagram of FIG. 6, as the inner ring 2 is rotated, the lubricating oil caught by the rib face 8 can be supplied between the rib face 8 and the large end face 14 of each tapered roller 4.

The lubricating oil that is supplied between the rib face 8 and the large end face 14 of each tapered roller 4 can thus reduce friction resistance between the rib face 8 and the large end face 14 of each tapered roller 4 even if the surface roughness of the rib face 8 of the inner ring 2 is not significantly reduced by, e.g., super finishing etc. as in conventional examples. This eliminates the need for super finishing etc. of the rib face 8, whereby manufacturing cost of the tapered roller bearing 1 can be reduced.

In the present embodiment as well, the plurality of recesses 17 (see FIGS. 4, 5) are formed in a predetermined range of the large end face 14. This can further improve lubrication performance between the rib face 8 and the large end face 14.

Figure 14:
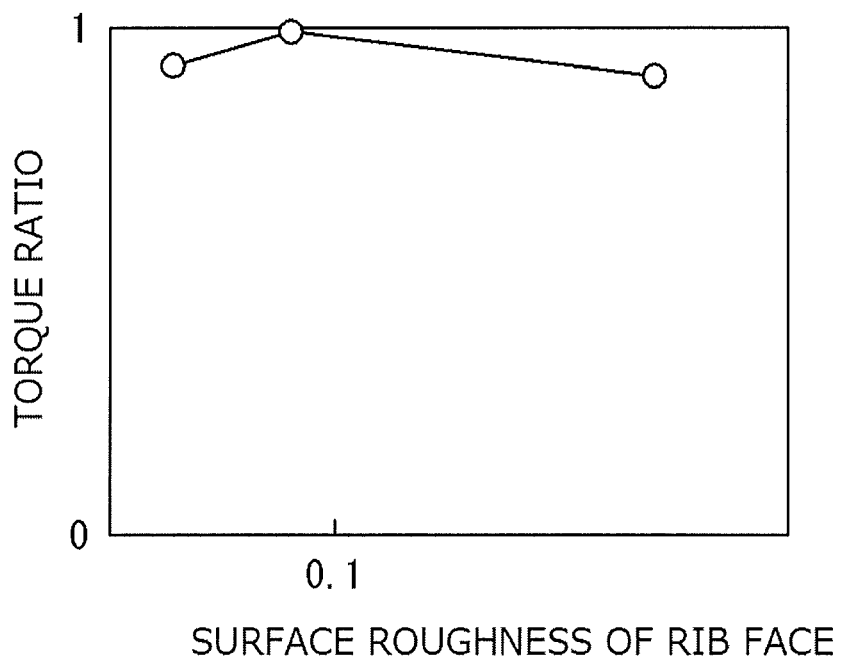
FIG. 14 is a graph (experimental result) illustrating the relationship between surface roughness of the rib face and rotational resistance in the tapered roller bearing.
Figure 15:
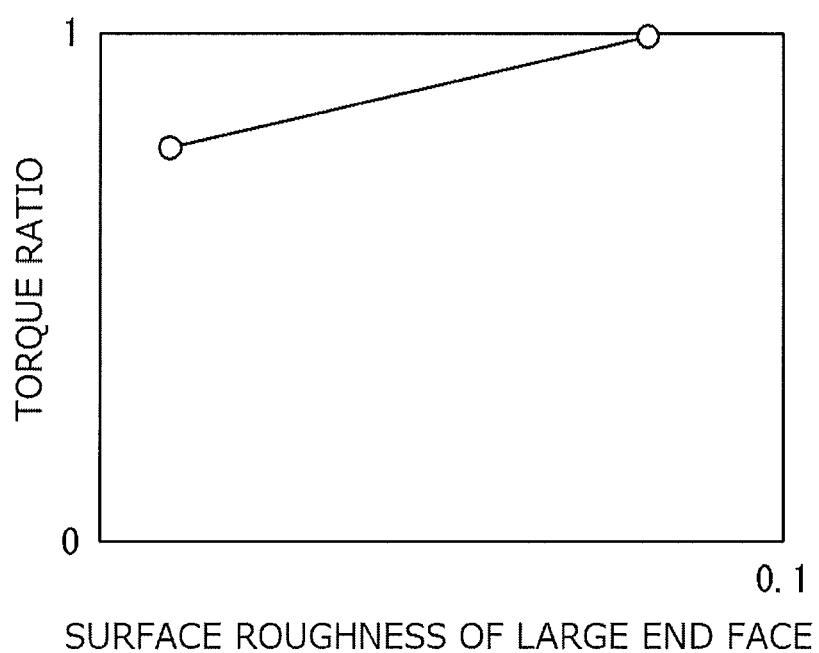
FIG. 15 is a graph (experimental result) illustrating the relationship between surface roughness of the large end face of the tapered roller and rotational resistance in the tapered roller bearing.
Figure 16:
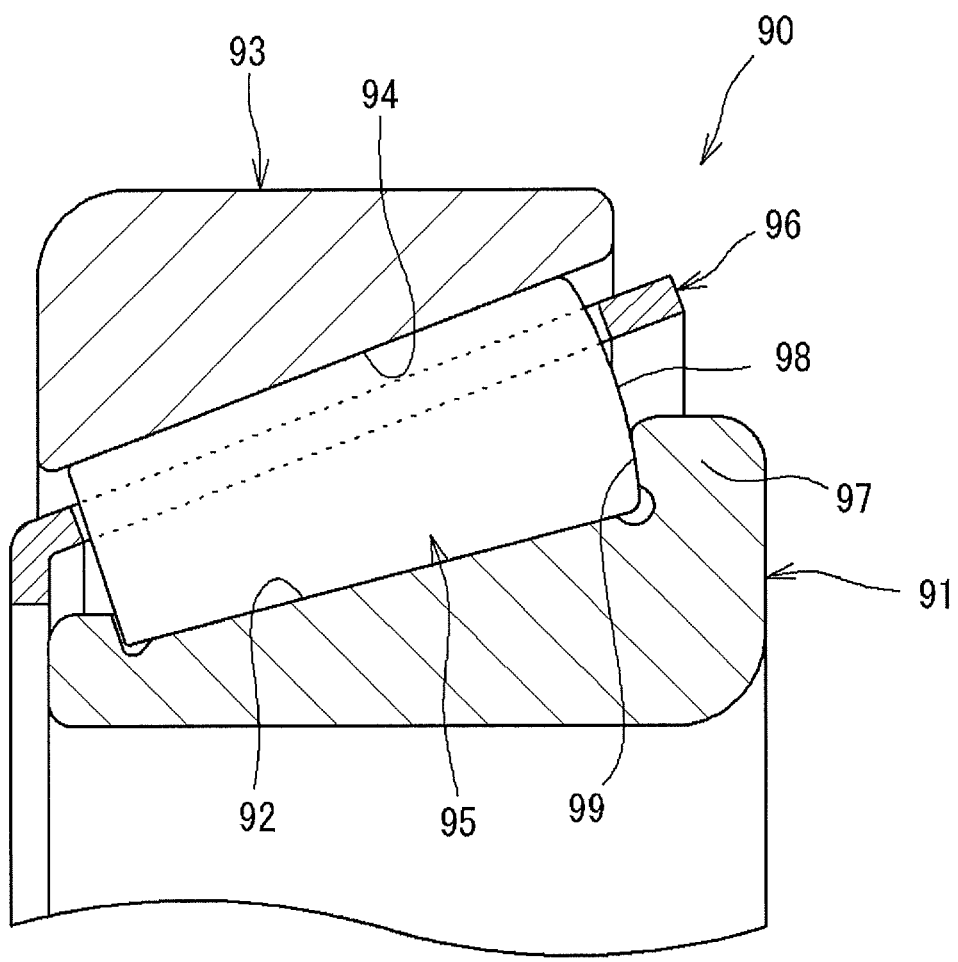
FIG. 16 is a longitudinal section of a conventional tapered roller bearing.

FIG. 14 is a graph (experimental result) illustrating the relationship between the surface roughness [μmRa] of the rib face 8 and the rotational resistance in the tapered roller bearing. FIG. 15 is a graph (experimental result) illustrating the relationship between the surface roughness [μmRa] of the large end face 14 of the tapered roller 4 and the rotational resistance in the tapered roller bearing. The rotational resistance is regarded as torque (friction torque) in the experiments. The torque of a conventional product is regarded as "1," and the ratio of the torque of the tapered roller bearing 1 of the present embodiment (first embodiment) to the torque of the conventional product is shown on the ordinate. That is, the torque ratio of less than 1 means that the torque (friction torque) of the present embodiment is smaller than that of the conventional product.

As shown in FIG. 14, the torque can be reduced as compared to the conventional product even if the surface roughness of the rib face 8 is 0.1 μmRa or more. This seems to be because of the following function of the rib face 8. In the present embodiment, since the rib face 8 has great surface roughness, the rib face 8 can catch the lubricating oil that is present therearound, and the lubricating oil caught by the rib face 8 is supplied between the rib face 8 and the large end face 14 of each tapered roller 4. Even if the surface roughness of the rib face 8 is as large as 1.0 μmRa or more, the torque (friction torque) can be significantly reduced by causing the large end face 14 of each tapered roller 4 to have surface roughness of less than 0.1 μmRa.

In the forms shown in FIGS. 4, 5, the area of the recesses 17 formed in the large end face 14 of the tapered roller 4 is preferably 1 to 20% of the area of the contact ellipse M. If the percentage of the area of the recesses 17 is low (less than 1%), the recesses 17 do not sufficiently function to hold the lubricating oil. If the percentage of the area of the recesses 17 is high (more than 20%), the contact surface pressure between the large end face 14 and the rib face 8 is increased, which may affect sliding properties.

The tapered roller bearing of the present invention is not limited to the illustrated forms, but may be implemented in other forms without departing from the scope of the present invention. For example, the cage 10 may have a shape other than that shown in the figures. The above embodiments are described with respect to the case where the rib face 8 of the large rib 7 of the inner ring 2 has the shape of a concave curve in longitudinal section. However, the rib face 8 may have a linear shape in longitudinal section. In this case as well, the capability of the rib face 8 to draw the lubricating oil that is present therearound can be improved by making the surface roughness σ2 of the rib face 8 greater than the surface roughness σ1 of the large end face 14 of each tapered roller 4 (σ2>σ1).

According to the present invention, the lubricating oil that is supplied between the rib face and the large end face of each tapered roller can reduce friction resistance between the rib face and the large end face of each tapered roller even if the surface roughness of the rib face of the inner ring that is to be slidingly contacted by the tapered rollers is not significantly reduced by, e.g., super finishing etc. as in conventional examples. This eliminates the need for super finishing etc. of the rib face, whereby manufacturing cost of the tapered roller bearing can be reduced.

What is claimed is:

1. A tapered roller bearing, comprising:
   an inner ring having a tapered inner ring raceway surface;
   an outer ring having a tapered outer ring raceway surface;
   a plurality of tapered rollers configured to roll on the inner ring raceway surface and the outer race raceway surface and each tapered roller having a large end face formed of a convex surface; and
   an annular cage that retains the plurality of tapered rollers at intervals in a circumferential direction, wherein:
   the inner ring has a rib face that is provided on a larger diameter side of the inner ring and that contacts the large end face,
   a surface roughness of the rib face is greater than that of the large end face,
   the rib face is a concave surface, and
   the tapered roller bearing satisfies Ri>R≥Rr, where:
   Rr represents a curvature radius of the large end face,
   Ri represents a curvature radius of the rib face in a longitudinal section of the inner ring, and
   R represents a distance from a cone center to a reference point, the reference point being an intersection of the rib face and an imaginary line extending from the cone center and along the inner ring raceway surface in the longitudinal section of the inner ring.

2. The tapered roller bearing according to claim 1, wherein
   the surface roughness of the rib face is 0.1 μmRa or more.

3. The tapered roller bearing according to claim 2, wherein
   the large end face has a recess formed in a range of a contact ellipse formed by contact between the large end face and the rib face.

4. The tapered roller bearing according to claim 1, wherein
   the large end face has a recess formed in a range of a contact ellipse formed by contact between the large end face and the rib face.

* * * * *